Aug. 29, 1961 S. A. MENCACCI ET AL 2,998,118
CONTAINER HANDLING APPARATUS
Filed Nov. 20, 1957 6 Sheets-Sheet 2

INVENTORS
SAMUEL A. MENCACCI
CHARLES TACK
BY Hans G. Hoffmeister
ATTORNEY Aug. 29, 1961 S. A. MENCACCI ET AL 2,998,118
CONTAINER HANDLING APPARATUS
Filed Nov. 20, 1957 6 Sheets-Sheet 3

INVENTORS
SAMUEL A. MENCACCI
CHARLES TACK
BY Hans G. Hoffmeister
ATTORNEY

Aug. 29, 1961  S. A. MENCACCI ET AL  2,998,118
CONTAINER HANDLING APPARATUS
Filed Nov. 20, 1957  6 Sheets-Sheet 6

FIG_16

FIG_14

FIG_15

INVENTORS
SAMUEL A. MENCACCI
CHARLES TACK

BY *Hans G. Hoffmeister*

ATTORNEY

United States Patent Office 2,998,118
Patented Aug. 29, 1961

2,998,118
CONTAINER HANDLING APPARATUS
Samuel A. Mencacci, Kappelenbox, and Charles Tack, Saint-Nicolas Waas, Belgium, assignors to International Machinery Corporation, Saint-Nicolas Waas, Belgium
Filed Nov. 20, 1957, Ser. No. 697,709
7 Claims. (Cl. 198—30)

The present invention relates to apparatus for handling articles such as cans or other types of containers, and is particularly concerned with improved feed and discharge means for continuous pressure cookers and like food processing apparatus.

Continuous pressure cookers are well known in the food industry. This type of cooker usually comprises a reel member having pockets in which food containers, such as cans, are supported and rotated within a closed chamber. Heat is introduced into the chamber through the medium of a hot gas or liquid. The continuous pressure cooker provides a number of advantages, including reduced labor costs, efficient fuel use, minimum handling of the food containers, shortened processing periods, and uniformity of product. However, the capital outlay required for such a cooker and associated apparatus is high. If a processor desires to treat more than one size of container, separate cooker apparatus for each such size has heretofore been required, with prohibitive costs often resulting.

It is, therefore, an object of the present invention to provide means for adapting pressure cooker apparatus for the processing of more than one size of container.

Another object of the present invention is to provide feed and discharge means for a continuous pressure cooker, which will enable the latter to process either a single large container, or a plurality of smaller containers in each of the cooker reel pockets.

Another object of the present invention is to provide safety devices in a continuous pressure cooker system, adapted for the processing of a plurality of containers supported in each reel pocket, which safety devices when actuated, automatically discontinue operation of the cooker or associated apparatus.

These and other objects and advantages of the present invention will become apparent from the following description thereof, taken in conjunction with the accompanying drawings, in which.

Figure 1:
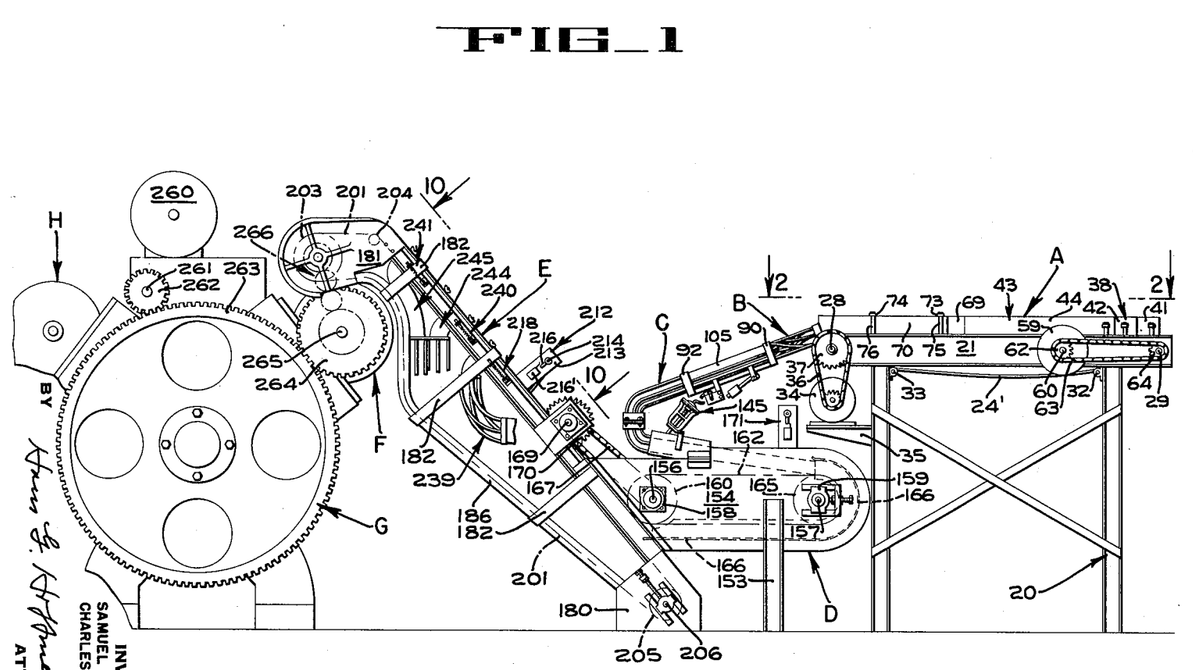
FIG. 1 is a side elevation of pressure cooker apparatus embodying the invention, being partly broken away.

Referring to the drawings, FIG. 1 illustrates a continuous pressure cooker and associated apparatus for feeding thereto cans filled with a commodity to be cooked. The cans are received upon a feed table A. They then proceed through a can turning device B and into a chute C. The latter conducts the cans to the cup feed D, which in turn feeds them to the elevator E. Said elevator E lifts the cans into the feed valve F of the pressure cooker G. After treatment in the cooker G the cans are discharged therefrom through the valve H.

The feed table A comprises a suitable frame structure 20, which provides spaced horizontal side members 21 and 21' (FIGS. 2 and 5) and horizontal transversely extending end members 22 and 23. A continuously moving endless wire mesh belt 24 is supported on a horizontal rectangular plate member 25 extending substantially the full length of table A. The plate 25 is bent downwardly at each side, each of the vertical flanges 25' thus produced being bolted to one of the frame side members 21 and 21'. The belt 24 is trained about a drive drum 26 and an idler drum 27, which drums are fixed at the discharge and feed ends, respectively, of the table A to transverse shafts 28 and 29. Shaft 28 is rotatably journalled in bearings 30 and 30', and shaft 29 is journalled in bearings 31 and 31', said bearings being supported by the side members 21 and 21'. Two transversely extending rollers 32 and 33 (FIG. 1) are rotatably supported on the frame 20 adjacent the feed and discharge ends, respectively, of the table A, below the plate member 25. The lower run 24' (FIG. 1) of belt 24 rides over these rollers 32 and 33 and is draped therebetween. A motor 34 rests on a bracket 35 supported by one of the legs of the table frame 20. Motor 34 rotates the shaft 28 by means of a sprocket and chain drive, the chain 36 being trained about a sprocket wheel 37 mounted on the said shaft 28.

A multiplicity of cans J are carried in upright position upon the belt 24 (FIGS. 2 and 5) having been placed thereon by an attendant, or by any suitable mechanical means. The belt 24 conveys said cans between a succession of matched, oppositely positioned vertical side plate members, which serve to properly channel the cans into the turning mechanism B. The cans proceed initially between stationary side plate members 38 and 38' (FIG. 2), which are secured to the inner ends of arms 39 and 39', respectively. The latter are bolted at their outer ends to the frame side members 21 and 21', respectively, and extend inwardly therefrom. The side plate members 38 and 38' have respective portions 41 and 41' which extend parallel with the frame side members 21 and 21', and portions 42 and 42' which extend obliquely inward with respect to the frame side members.

Adjacent the fixed side plate members 38 and 38' are movable side plate members 43 and 43', having portions 44 and 44', respectively, in alignment with the obliquely extending plate portions 42 and 42' of the said fixed plate members. The plate portions 44 and 44' are respectively mounted upon vertical pivot pins 45 and 45' (FIGS. 2 and 3) carried by the inner ends of transversely extending arms 46 and 46'. The arms 46 and 46' are respectively connected at their outer ends to the frame side members 21 and 21', by bolts 47 and 47'.

Figure 4:
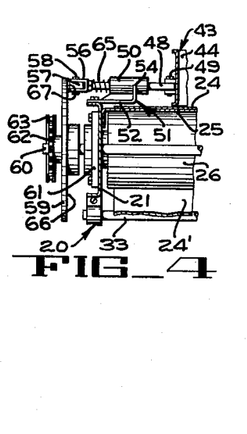
FIG. 4 is a fragmentary transverse vertical section taken along line 4—4 of FIG. 2.

Oscillating movements are imparted to the side plate members 43 and 43' through a pair of transversely extending rods 48 and 48' (FIGS. 2 and 4), at the respective inner ends of which the plate members are supported upon vertical pivot pins 49 and 49'. The points of support are approximately midway the length of the plate portions 44 and 44'. Rods 48 and 48' are slidably supported within transversely extending cylindrical bearing tubes 50 and 50', carried respectively by angle plates 51 and 51'. The horizontal legs 52 and 52' of the angle plates are bolted to the respective table frame side members 21 and 21', and extend inwardly therefrom. The vertical legs 54 and 54' of the angle plates are respectively formed along their upper edges with semi-circular depressions 55 and 55', which depressions are adapted to receive the bearing tubes 50 and 50'. The bearing tubes are preferably welded in place in the depressions 55 and 55', and are thus immovably supported in horizontal position.

The rods 48 and 48' carry at their outer ends generally U-shaped roller support members 56 and 56', respectively, the arms of each said roller support member being in vertically superposed position and extending outward beyond the respective table frame side member. The members 56 and 56', respectively, carry rollers 57 and 57', mounted for rotation in a horizontal plane upon vertical pins 58 and 58' extending between the respective superposed arms of the members.

Two cam wheels 59 and 59' are positioned adjacent the frame side members 21 and 21', respectively, fixed upon a rotatable shaft 60 extending transversely beneath the plate 25. The shaft 60 is rotatably journalled adjacent each end in a bearing carried by the respective frame side member, one such bearing 61 being shown in FIG. 4. A sprocket wheel 62 is driven by a chain 63, which is in turn driven by a sprocket wheel 64 (FIGS. 1 and 2) secured to the idler drum shaft 29. Sprocket wheel 62 serves to rotate shaft 60, being fixed thereto.

The rods 48 and 48' bear compression springs 65 and 65', respectively, each said spring being positioned between the respective bearing tube and roller support member. The springs 65 and 65' tend to maintain the rollers 57 and 57', respectively, in contact with the inner surfaces 66 and 66' of the wheels 59 and 59'.

The inner surface 66 of the wheel 59 is formed with a projection 67 (FIGS. 2 and 4) adjacent the circumferential edge thereof. The inner surface 66' of the wheel 59' is formed with a depression 68 (FIG. 2) directly opposite the projection 67. It will be seen that the projection 67 and depression 68 will cooperate to cam the rods 48 and 48' into transverse oscillatory movement with each rotation of the wheels 59 and 59'.

At the one side of the table A, the roller 57 is ordinarily maintained by the spring 65 in contact with the flat inner surface 66 of the wheel 59. The projection 67 will, once with each rotation, force said roller 57 and associated support member 56 and rod 48 inwardly against the pressure of the spring 65. When the projection 67 has moved past the roller 57, the spring 65, bearing against the roller support member 56, will return the latter and the rod 48 associated therewith to their original position, in which the roller 57 abuts the flat inner surface 66 of the wheel 59.

At the other side of the table A, the spring 65' will normally maintain the roller 57' in contact with the flat inner surface 66' of the wheel 59'. However, once with each rotation, and at the same time that the projection 67 encounters the rollers 57, the depression 68 will be rotated into line with the roller 57', and the said spring will force the roller 57' into the depression, and thereby thrust the corresponding support member 56' and rod 48' outward. However, when the wheel 59' rotates further, the roller 57' is forced out of the depression 68, and again into contact with the flat surface 66'. As a result, the member 56' and rod 48' are thrust inwardly against the pressure of the spring 65'.

As a result of the oscillatory movement thus imparted to the rods 48 and 48', the side plate members 43 and 43' are oscillated, and possible jamming of the cans J therebetween is thereby prevented. It is to be observed that the two side plate members move simultaneously, with each side plate member always moving in the same direction as the other, thus maintaining susbtantially constant the space between the two side plate members.

Figure 2:
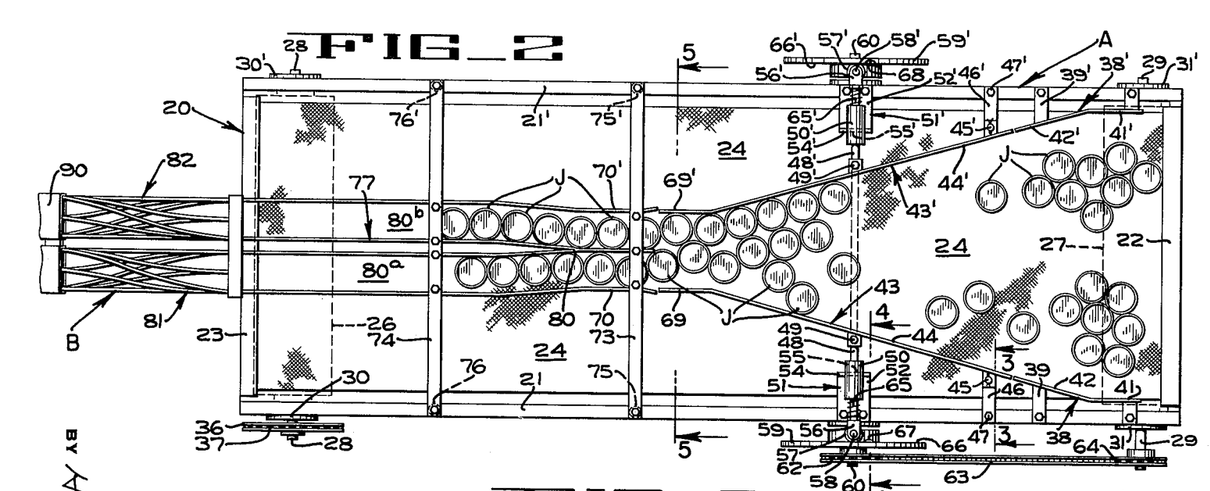
FIG. 2 is an enlarged plan view as indicated by the line 2—2 of FIG. 1, a plurality of cans being shown carried by the apparatus.
Figure 3:
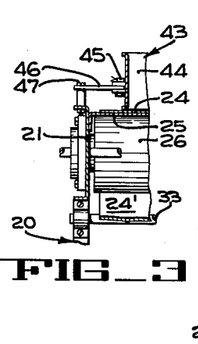
FIG. 3 is a fragmentary transverse vertical section along line 3—3 of FIG. 2.
Figure 5:
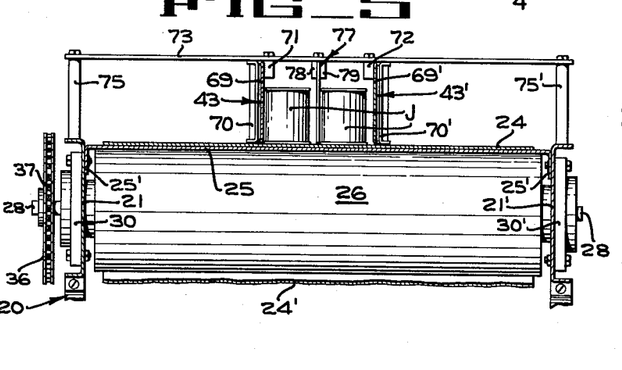
FIG. 5 is a fragmentary transverse vertical section taken along line 5—5 of FIG. 2.

The movable side plates 43 and 43' terminate at their respective inner ends in longitudinally extending comparatively closely spaced parallel plate portions 69 and 69' which channel the cans into a throat section of the feed table A. The throat section is formed by fixed side plates 70 and 70' which are supported by suspension members 71 and 72 carried respectively by transversely extending arms 73 and 74 (FIGS. 2 and 5). The arms 73 and 74, respectively, are bolted at their outer ends to vertical support pins 75, 75' and 76, 76' carried by the frame side members 21 and 21'. A removable longitudinally extending vertical central partition 77 is supported by suspension members 78 and 79, carried by the arms 73 and 74, respectively. The partition 77 is forked at 80, and divides the throat section into two separate channels 80a and 80b.

Figure 6:
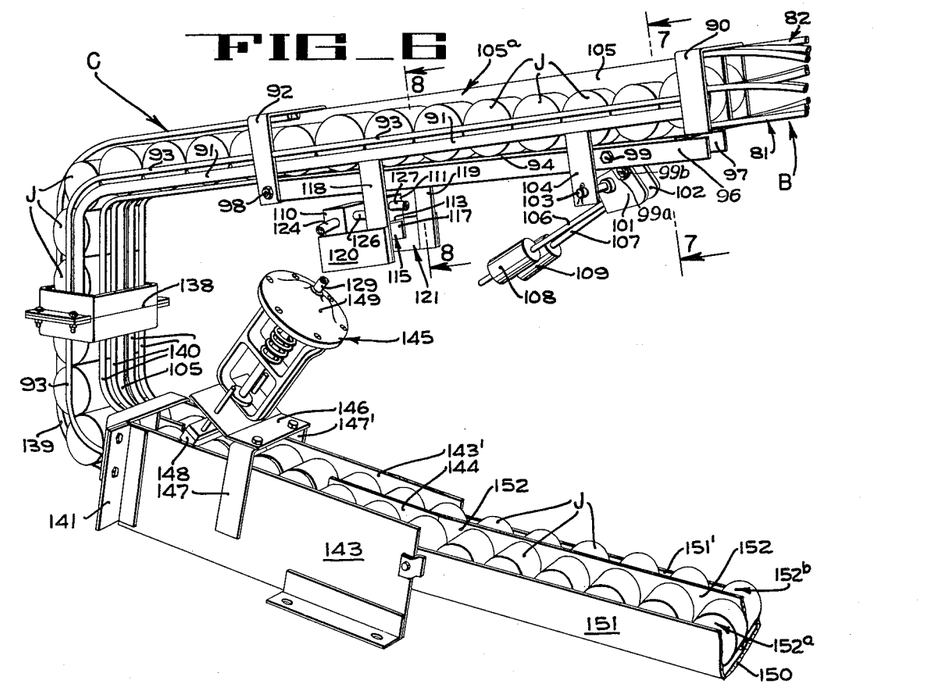
FIG. 6 is an enlarged fragmentary perspective of one portion of the container feed apparatus of the invention, a plurality of cans being shown carried thereby.
Figure 7:
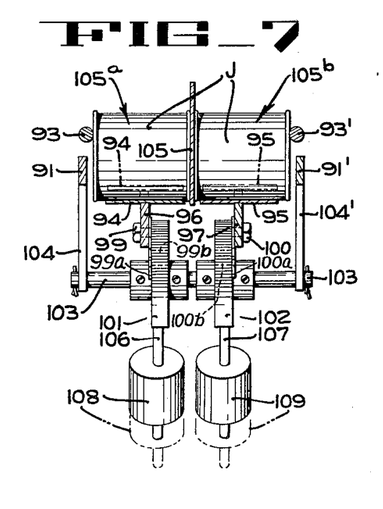
FIG. 7 is a transverse section along line 7—7 of FIG. 6, a second operative position of the apparatus being shown in phantom.

The cans J proceed from table A into a can turning device B of any suitable design. This device preferably comprises a pair of parallel downwardly inclined spiral troughs 81 and 82, being for example of the type disclosed in Small U.S. Patent 1,193,624. Each spiral trough 81, 82 receives the cans J from but one of the channels 80a, 80b; and in each trough 81, 82 the cans are turned from their initial, vertical position to a substantially horizontal one. The cans then pass into the inclined can feed chute C through a bracket 90 of square cross section, which is mounted by any suitable means upon the lower ends of the spiral troughs 81 and 82, and supports the upper end of the chute C (FIG. 6). Two opposed chute side bars 91 and 91' are at their upper ends connected respectively to the downwardly extending side legs of the bracket 90 by any suitable means, such as welding. A second bracket 92, of inverted U-shape, is spaced from the bracket 90, said second bracket being supported by attachment of the side legs thereof to the side bars 91 and 91' (FIGS. 6, 7 and 8), preferably by welding. Two opposed side rods 93 and 93' are supported between the brackets 90 and 92, being secured to the side legs of the brackets. These rods provide additional side support for the cans in the chute, as well as additional support for the bracket 92.

Two parallel longitudinally extending plates 94 and 95 (FIG. 7) form the bottom of the chute section between the brackets 90 and 92. The plates 94 and 95 are carried by longitudinally extending support arms 96 and 97, respectively. The latter are pivotally mounted at their lower ends upon a pin 98 (FIG. 6) extending transversely between the lower ends of the side legs of the bracket 92. Adjacent their upper ends, the support arms 96 and 97, respectively, are pivotally connected by bolts 99 and 100 (FIG. 7) to short links 99a and 100a in turn are pivotally connected by flat head screws 99b and 100b, respectively, counterweight bearing members 101 and 102. These members 101 and 102 pivot upon a transverse pin 103 supported between the lower ends of downwardly extending arms 104 and 104' carried by the side bars 91 and 91', respectively. A vertical plate 105, supported by suitable suspension members (not shown) carried respectively by the top cross-portions of the brackets 90 and 92, divides the chute section between brackets 90 and 92 into two lanes 105a and 105b of approximately equal width each of which communicates at its upper end with one of the spiral troughs 81, 82.

Suspended from the members 101 and 102, respectively, by means of downwardly inclined rods 106 and 107 are two counterweights 108 and 109. When the chute section between the brackets 90 and 92 is completely filled with cans, the weight of said cans maintains the bottom plates 94 and 95 in the position shown in full lines in FIGURES 7 and 8. On the other hand, when either of the two lanes of cans runs short, the weight upon the plate 94 or 95, as the case may be, is reduced, and the respective counterweight causes said plate to pivot upwardly into the position shown in phantom in FIG. 7.

Figure 8:
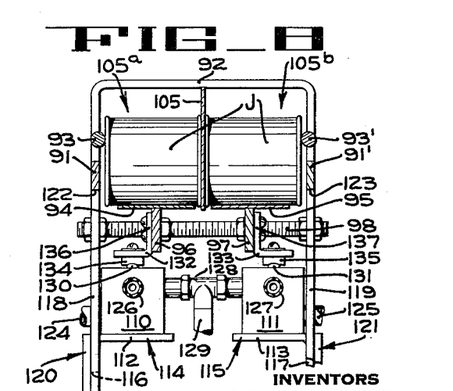
FIG. 8 is a transverse section along line 8—8 of FIG. 6, being partly broken away.

Referring more particularly to FIG. 8, it will be seen that two air valves 110 and 111 are mounted below the plates 94 and 95 and adjacent the lower ends thereof, said valves being supported upon the inwardly extending transverse legs 112 and 113 of angle plate members 114 and 115, respectively. The downwardly extending legs 116 and 117 of the members 114 and 115 are welded respectively to the longitudinally extending legs 118 and 119 of L-shaped brackets 120 and 121. The latter are welded at their upper ends 122 and 123, respectively to the chute side bars 91 and 91'. The air valves 110 and 111 are of standard design. They receive air at low pressure through intake tubes 124 and 125, respectively, and air at high pressure through intake tubes 126 and 127, respectively. When low pressure air is admitted to either of the tubes, a diaphragm therewithin is actuated, and a port (not shown) communicating with the respective high pressure air intake tube 126 or 127, as the case might be, is thereby opened. The high pressure air admitted into either of the tubes 126 or 127 is directed through a pipe 128 extending between the valves into a high pressure air outlet tube 129.

The valve ports (not shown) controlling flow from the low pressure air intake tubes 124 and 125 are opened and closed respectively by means of vertical pins 130 and 131, which are actuated by movement of the support arms 96 and 97. L-shaped connector members 132 and 133 are respectively bolted at their transverse legs to the pin heads 134 and 135, and adjacent their upper ends to the support arms at 136 and 137.

When both lanes 105a and 105b are completely filled with cans, and the arms 96 and 97 and pins 130 and 131 are in their lowermost positions, as seen in FIG. 8, the low pressure intake ports 124 and 125 are closed. However, when either of the lanes 105a or 105b falls short of cans, and the respective arm 96 or 97 is pivoted upwardly into the position shown in phantom in FIG. 7, the respective member 132 or 133 and pin 130 or 131 are thereby raised and the respective low pressure air intake port opened. As a consequence, the port controlling the respective high pressure intake tube 126 or 127 is opened, and air at high pressure is supplied through pipe 128 to high pressure air outlet tube 129. The latter is connected with an air brake to be described hereinbelow.

The can chute C below the bracket 92 bends downwardly (FIG. 6), and the downwardly directed portion is joined by a coupling 138 to a lower chute portion comprised of outer bars 139 and inner bars 140. The side rods 93 and 93' and center divider plate 105 continue along this lower portion of the chute, and consequently the two separate lanes 105a and 105b likewise are continuous throughout the full length of the chute C.

Said lower chute portion carries at its lower end a square bracket member 141, which supports a gate section and a track section, through which the cans are admitted into the cup feed D. The gate section is constructed of an inclined bottom plate 142 (FIG. 9), vertical side plates 143 and 143' (FIGS. 6 and 9), and a central divider plate 144. An air brake 145 of standard design is mounted upon an angle plate 146 positioned above the gate section by means of suitable support arms 147 and 147' carried by the side walls 143 and 143', respectively. Air brake 145 is so positioned that, when actuated, the brake shoe 148 thereof will bear against cans on both sides of the partition 144 and thus will stop flow of cans through the gate section. The air brake 145 is connected through its headplate 149 to the hereinbefore mentioned tube 129, and is operated when high pressure air passes through the latter. Hence, whenever either lane 105a or 105b does not contain enough cans to depress the associated plate 94 or 95, as the case might be, the gate section will be closed, and no cans can pass therethrough from chute C.

Figure 9:
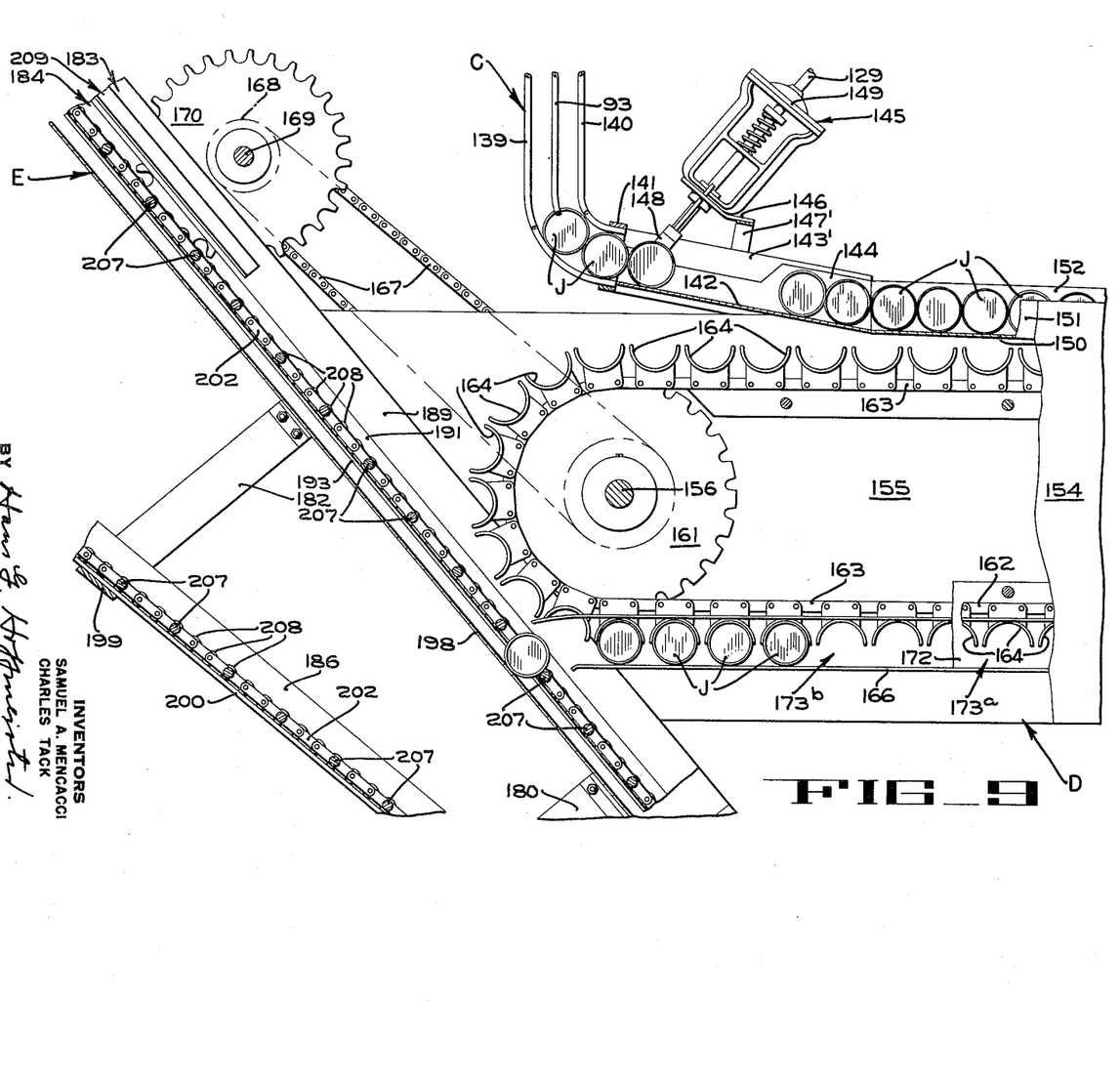
FIG. 9 is a vertical section of another portion of the container feed apparatus of the invention, being partly in elevation, a plurality of cans being shown carried thereby.

However, when both lanes 105a and 105b are properly filled, cans proceed through the gate section into a track section constructed of an inclined bottom plate 150, vertical side plates 151 and 151' bolted to the plates 143 and 143', respectively, and a center divider plate 152 that constitutes a continuation of the divider plate 105 and thus divides the passageway through the track section into two channels 152a and 152b communicating with the discharge ends of the lanes 105a and 105b, respectively, of the chute C. From the gate section, the cans advance into the cup feed D (FIGS. 1 and 9). The cup feed is mounted on side legs, one such leg 153 being shown in FIG. 1, and has two parallel vertical side walls 154 and 155. Mounted between the side walls 154 and 155 are two parallel transverse shafts 156 (FIGS. 1 and 9) and 157 (FIG 1). These shafts are journalled in suitable bearings carried by the walls 154 and 155, the bearings 158 and 159 associated with only one wall being shown (FIG 1). Fixed to shaft 156 are transversely spaced drive sprocket wheels 160 (FIG. 1) and 161 (FIG. 9), about which are trained two identical chains 162 (FIGS. 1 and 9) and 163 (FIG. 9) bearing cups 164 thereon. The shaft 157 carries two idler sprocket wheels, about which the chains 162 and 163 are likewise trained. One of these, sprocket wheel 165, is shown in FIG. 1. An outer plate 166 extends between the walls 154 and 155, being secured by any suitable means to said walls. Plate 166 provides a curved end wall for the cup feed, and also provides a horizontal floor plate located below the lower flights of the chains 162 and 163. It will be seen that the cans, in passing through the cup feed D, are firstly carried in a horizontal direction by the upper flight of the chains; then in a downwardly curving direction; and finally in a horizontal direction opposite to the first said direction.

The drive sprocket wheels 160 and 161 are rotated by means of a drive chain 167 (FIGS. 1 and 9) driven by a sprocket wheel 168 (FIG. 9). The sprocket wheel 168 is secured to a shaft 169, which likewise carries large sprocket wheels 170 operated by the chains (described below) of elevator E. A detector device 171 (FIG. 1) is positioned at the entrance of the cup feed D, this device being designed to detect any upstanding cans which might enter the cup feed. The detector device is of a type to be described below in connection with the elevator E, and will therefore not be further described at this point.

The cup feed D is provided with a central divider plate 172 (FIG. 9) separating the passageway therethrough into two channels 173a and 173b that communicate with the channels 152a and 152b, respectively, of the gate section (FIG. 6). The divider plate 172 is removably mounted in the cup feed D in any convenient manner. As a result, the cup feed may, if desired, be employed for a single file of tall cans, instead of a double file of short cans. In such a case, the chute C and the gate and track sections at the lower end thereof would be replaced by an assembly designed for the single file of tall cans.

The elevator E (FIGS. 1 and 9–13) which receives the cans from the cup feed D, comprises an inclined framework supported at its lower end upon a pedestal 180 (FIG. 1) and having for its upper end a head casting 181 supported by the housing of the cooker feed valve F. The elevator framework includes three pairs 182 of opposed, laterally spaced, side members, all of which are bent inwardly at their upper and lower ends.

The elevator framework also includes four pairs of longitudinally extending and laterally spaced angle bars 183, 184, 185 (FIG. 12) and 186 (FIG. 1), respectively, all of which extend throughout the full length of the elevator E. The two angle bars 183 (FIG. 12) extend along the upper side of the elevator E, and each angle bar 183 includes an outwardly directed flange 187 that is welded or otherwise secured to the inwardly bent upper end portions 188 of the side frame members 182 on the corresponding side of the elevator frame. The downwardly projecting flanges 189 of the angle bars 183 serve as supports for the elevator roof plates and the can centering finger mechanisms, to be described hereinbelow.

The second pair of angle bars 184 are positioned a short distance below the uppermost pair 183, their vertical flanges 191 being fixed to the frame side members 182 on the respectively corresponding sides of the elevator frame. The inwardly projecting flanges 193 of the angle bars 184 serve as tracks for the upper flight of the elevator chains, to be described below.

The third pair of angle bars 185 are positioned below the angle bars 184, the vertical flange 195 of each bar 185 being secured to the associated frame side members 182. The inwardly projecting flanges 197 of the angle bars 185 serve as supports for the floor plate 198 of the elevator, upon which the cans being fed into the cooker by the elevator are supported.

The angle bars 186 (FIG. 1) define the bottom of the framework of the elevator E and are supported by the inwardly projecting lower end portions 199 (FIG. 9) of the frame side members 182. The inwardly projecting flanges 200 of the angle bars 186 serve as tracks for the lower flight of the elevator chain, to be described hereinbelow, and are so spaced from the angle bars 185 and floor 198 that sufficient clearance is provided for can return chutes 239, 244, 245 to be described hereinbelow.

The elevator E includes two spaced endless chains 201 (FIGS. 9, 10 and 12) and 202 (FIGS. 10 and 12) trained around two sprocket wheels 203 (only one of which is shown in FIG. 1) mounted for rotation wthin the head casting 181 of the elevator, as are likewise a pair of idler sprocket wheels 204. The chains 201 and 202 are also trained around idler sprocket wheels 205 (one such sprocket wheel 205 being shown in FIG. 1) mounted on a common shaft 206 within the pedestal 180. Cylindrical rods 207 (FIGS. 9, 10 and 12) are fastened to and extend between the two chains 201 and 202 at equal intervals along their entire length, and form can receiving spaces therebetween. Each of the chains 201 and 202 is provided with rollers 208 (FIG. 12) spaced along the entire length thereof. The rollers 208 for each of the chains 201 and 202 ride along the flanges 193 of the frame member angle bars 184.

It will thus be seen that the cans fed to the elevator E by the cup feed D are supported between the rods 207 of the elevator, and are thereby advanced upwardly along the floor plate 198 and into the cooker feed valve F. To assure smooth movement of the cans as they proceed up the elevtor, two additional angle bars 209 are secured to the vertical flanges 189 of the angle bars 183 in position for their inwardly projecting flanges 211 to serve as ceiling plates for the elevator, and prevent any jumping of the cans.

A number of safety devices, to be now described, are provided in the elevator to prevent any possibility of feeding a single small can to the cooker feed valve F. At the lower end of the elevator E is mounted a device 212 (FIGS. 10 and 11) for detecting any cans being transported by the elevator which might be upstanding. This detecting device 212 comprises two transversely aligned upstanding brackets 213 mounted upon the flanges 187 of the angle bars 183, which brackets support therebetween a transversely extending rod 214. Pivotally mounted upon said rod is downwardly extending detector arm 215, the lower end of which is laterally extended and is so positioned that it will be struck by any upstanding can conveyed by the elevator. When struck by an upstanding can, the detector arm 215 will cause the rod 214 to rotate. The rod 214 bears an actuator arm 216 on one end thereof, which operates a switch 216′ (FIG. 1). When this occurs, the actuator arm 216 (FIG. 1) moves in such a way as to cause the switch 216′ (FIGS. 1 and 10) to open. The switch 216′ is included in the circuit (not shown) of the motor that drives the elevator E, and consequently when an upstanding can engages the detector arm 215, the motor is deenergized and the elevator E is stopped. A manually operable resetting handle 217 (FIGS. 10 and 11) is provided on the opposite end of the rod 214, to facilitate restoring the detector arm 215 to its operating position after the upright can has been turned to its proper horizontal position or has been removed.

The detector device 171 at the entrance of the cup feed, referred to hereinabove, is identical in both structure and manner of operation to the presently described device 212. It operates to stop the apparatus in the event that any upstanding can starts to enter the cup feed D.

Figures 10, 11, 12, 13:
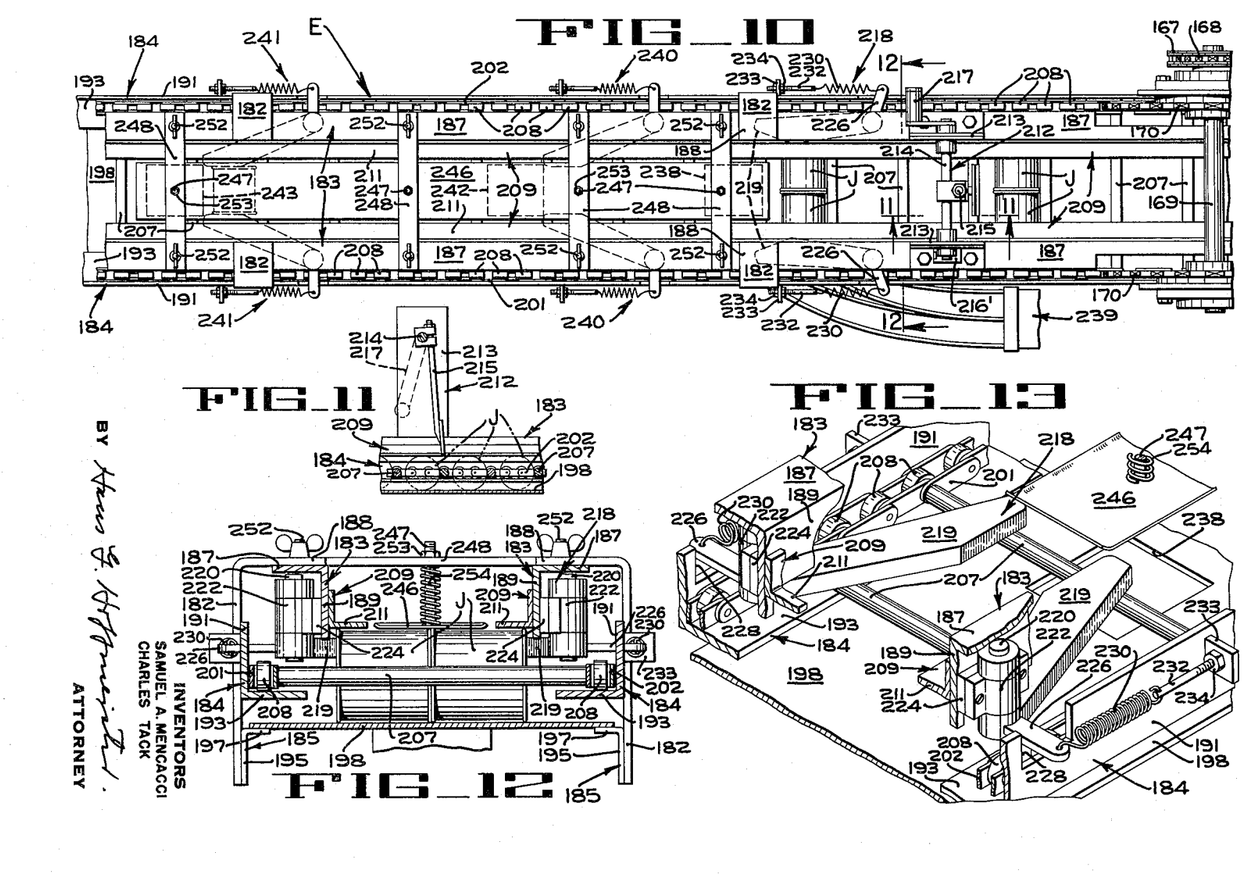
FIG. 10 is an enlarged plan view as indicated by the line 10—10 of FIG. 1, showing a plurality of cans being processed in the apparatus.
FIG. 11 is a fragmentary vertical section along line 11—11 of FIG. 10, showing a plurality of cans being processed through the apparatus.
FIG. 12 is an enlarged fragmentary vertical section along line 12—12 of FIG. 10.
FIG. 13 is an enlarged perspective partly broken away, of a portion of the apparatus shown in FIG. 10.

Mounted upon the elevator, above the detector device 212, is a centering finger mechanism 218 (FIGS. 10, 12 and 13). This mechanism serves the purpose, when the elevator is employed for the conveyance of a double file of short cans, of centering any single short can which might be carried in any of the spaces between the rods 207. This mechanism comprises a pair of opposed inwardly extending centering fingers 219, each of which is pivotally mounted at its lower end upon a pivot rod 220. Each of the pivot rods 220 is mounted in a suitable bearing member 222 which is supported upon a block 224 bolted to the vertical flange 189 of one of the angle bars 183. Connected with each of the fingers 219 is an arm 226 which extends outwardly through a cut-out 228 in the flange 191 of the associated angle bar 184. Each arm 226 is connected at its outer end with the lower end of a tension spring 230. Each spring 230, at its upper end, is connected to a pin 232. The latter extends parallel with the associated angle bar flange 191 and through a block 233 fixed to the associated flange 191. Nuts 234 threaded onto the pins 232 and engaging opposite faces of the respectively associated blocks 233 provide for facile adjustment of the tension of the springs 230.

Adjacent the free ends of the can centering fingers 219, a square drop-out hole 238 is cut in the floor plate 198 of the elevator. This drop-out hole is of such size as to allow single short cans of the size transported in double file by the elevator to drop therethrough. Such cans are returned to the feed table A by means of the hereinbefore mentioned chute 239 (FIG. 1).

Two additional can centering devices 240 and 241, identical in structure and operation to the above described centering device 218 are also provided along the elevator, for centering any single short cans which might by chance get by the first set of fingers 219 and drop-out hole 238. Corresponding can drop-out holes 242 and 243 are provided, through which cans pass into chutes 244 and 245, respectively (FIG. 1), which likewise may return the dropped cans to the feed table A, or may conduct them elsewhere, as desired. These chutes also might be equipped with switches for stopping the elevator, or with warning signal devices.

A presser plate member 246 (FIGS. 10, 12 and 13), extending over all of the drop out holes 238, 242, and 243, is suspended by means of four downwardly extending rods 247 (FIG. 10), carried respectively at the centers of four spaced bars 248. The latter are mounted at their respective ends by means of nuts and bolts at 252, upon the flanges 187 of the angle bars 183. Each rod 247 is threaded at its upper end, which passes slidably through an aperture in the respective cross bar 248 and receives a nut 253. A compression spring 254 is carried by each of the rods 247 between the respective cross bar 248 and the presser plate 246.

It will be noted that the springs 230 tend to pivot the fingers 219 inwardly. As long as the cans are present in double file in the spaces between the rods 207, the fingers 219 will be forced apart, allowing said cans to pass up the elevator. In FIG. 10, the centering finger mechanism 218 is shown in this position. However, if by chance only a single short can should be present in any of chain spaces, then this can will be centered transversely of the elevator as it passes between any of the centering mechanisms 218, 240 and 241 and it will drop through the respective drop-out hole. The spring-loaded presser plate 246 serves to keep steady the pairs of cans which pass thereunder, and to force through the drop-out hole any single short cans which appear. A centered single can is shown in phantom adjacent the hole 243 in FIG. 10.

The can cooker G and feed valve F thereof are of conventional design, and will therefore not be fully described here. The drive means for the cooker includes a motor 260 which serves to rotate a drive shaft 261 (FIG. 1) by any suitable driving connection (not shown). The shaft 261 extends longitudinally of the cooker, and at each end of the drive shaft 261 is carried a spur gear 262, each of which meshes with the large gear 263 at the associated end of the reel (not shown) of the cooker. A pinion gear 264 mounted on a shaft 265 meshes with the gear 263 and serves to operate the feed valve F of the cooker G. A gear train 266 driven by the pinion gear 264 serves to operate the upper sprocket wheels 203 of the elevator E and thus to drive the chains 201 and 202. Associated with the gear train 266 is a safety clutch (not shown), to which the switches of the detector devices 171 and 212 are connected. When either of these switches is actuated, the clutch is disengaged, and operation of the cup feed D, elevator E and feed valve F is thereby discontinued.

Figures 14, 16:
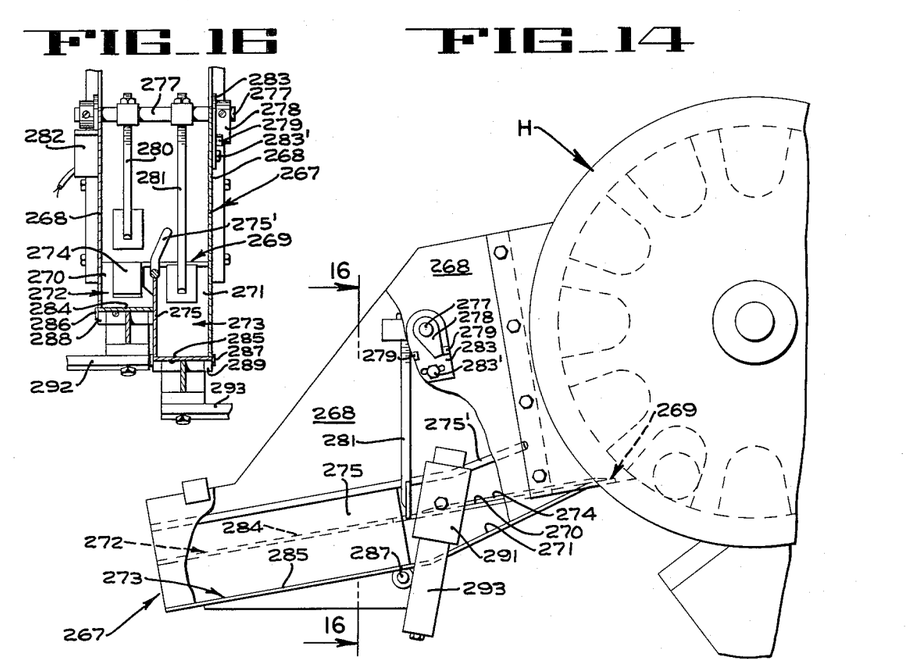
FIG. 14 is an enlarged fragmentary side elevation of the can discharge apparatus of the invention.
FIG. 16 is a fragmentary vertical section along line 16—16 of FIG. 14.
Figure 15:
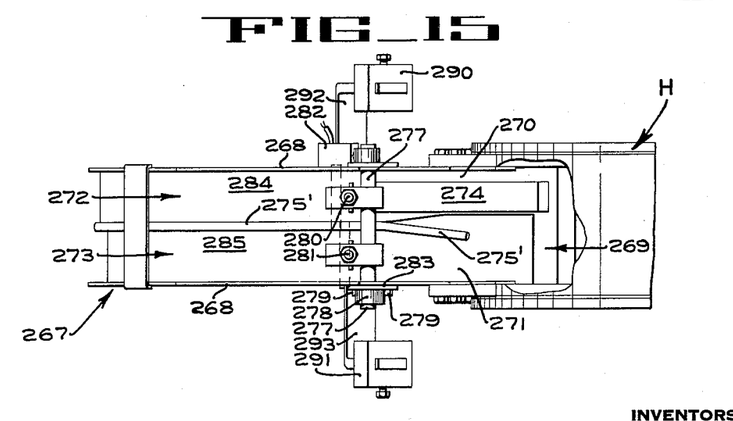
FIG. 15 is a plan of the apparatus shown in FIG. 14.

The cans are transported through the cooker G by means of a conventional rotating reel and a cooperating stationary spiral rail (not shown) defining can compartments. An example of a cooker operating in this manner is disclosed in the U.S. Patent to Wilbur No. 2,536,116. When tall cans are being handled the inlet valve F feeds the cans one at a time into the compartments; whereas when short cans are being handled the cans are fed two at a time, one from each side of the elevator E. As the cans emerge from the cooker they are conducted through the discharge valve H to a discharge conveyor 267 (FIGS. 14, 15 and 16). When short cans are being handled the cans leave the cooker two at a time, i.e., in two separate lanes.

In order to facilitate handling of the cans after they leave the discharge valve, it is desirable to direct the two lanes in which short cans emerge from the cooker to two separate points of discharge. For this reason discharge conveyor 267 whereby short cans are handled as they leave the discharge valve H provides a double level floor for separating the two lanes of cans.

The conveyor 267 comprises two spaced side walls 268 between which each pair of cans travel in end to end relation as they emerge from the cooker along a plate 269 that slopes downward at sufficient inclination for the cans to advance thereon by gravity. The plate 269 is split longitudinally for most of its length, thus providing two ramps 270 and 271, respectively that slope downward at different inclinations from the part of the plate 269 that is first encountered by the cans as they issue from the valve H. The cans in one lane roll down the upper ramp 270 to an upper discharge chute 272 while the cans in the other lane roll down the more steeply sloping ramp 271 to a lower discharge chute 273.

In forming the two ramps 270 and 271, the plate 269 is so cut that the lower ramp 271 is slightly wider than the height of the cans that it is intended to handle. The excess width of the ramp 271 provides assurance that the beads on both ends of a can will be supported by the ramp 271 so that the can will roll in a straight line. However, in providing such excess width of the lower ramp 271 the upper ramp is made considerably narrower with the result that as a can rolls down the upper ramp 270 one end of the can is apt to overhang an edge of the ramp and the bead on that end of the can is unsupported. If, under such circumstances, the bead at the other end of the can were to roll on the ramp the can would be apt to roll otherwise than in a straight line. To prevent this from happening, a plate 274 is provided on the upper surface of the ramp 270 extending longitudinally thereof. The plate 274 is of somewhat lesser width than the distance between the beads of a can and is of sufficient thickness to engage the central portion of the can and thereby to prevent the bead at either end of the can from contacting the ramp 270 as the can advances along the same. This assures straight line motion of the cans as they progress to the upper discharge chute 272.

A vertical dividing wall 275 (FIG. 14) separates the two discharge chutes 272 and 273 and a curved guide finger 275' (FIGS. 14 and 15) projects toward the discharge valve H from the divider wall 275 to guide the cans from the ramp 270 into the upper discharge chute 272.

A transversely extending shaft 277 is rotatably carried by the side walls 268 approximately above the rear end of the wall 275. Suspended from the shaft 277 and fixedly secured to the same are two detector arms 280 and 281, one being positioned above each of the ramps 270 and 271. The arms 280 and 281 serve to detect any upstanding cans which might be approaching the chutes 272 and 273, respectively. Upon detection of any such can, the shaft 277 is rotated, and a switch 282, to which the shaft 277 is connected, is actuated. The switch 282 is connected in the control circuit of the motor 260, and turns off said motor and thereby discontinues operation of the cooker when either detector arm 280 or 281 is moved by an upstanding can. A finger 278 rigid with the shaft 277 is movable between spaced abutment stops 279 on a bracket 283, which limit the rotary movement of the shaft 277 and the detector arms 280 and 281. The bracket 283 is rotatably carried by the shaft 277 and is adapted to be releasably secured in selected position of adjustment by a bolt 283' extending loosely through an arcuate slot in the bracket and screwed into a tapped hole (not shown) in the adjacent side wall 268 of the discharge conveyor 267.

As an additional safety measure the chutes 272 and 273 are provided adjacent their receiving ends with floor sections 284 and 285, respectively, that are adapted to drop in case they become overloaded with more cans than they customarily handle when the cans progress across the same without interruption. Such excessive loading of either floor section 284 or 285 would occur if the associated chute 272 or 273, as the case might be, were to become jammed at some point beyond the floor section.

The floor sections 284 and 285 are mounted on pivot rods 286 and 287, respectively, that are supported in bearings 288 and 289, respectively, secured to the side walls 268 of the discharge conveyor 267 adjacent the lower ends of the ramps 270 and 271. The floor sections 284 and 285 are normally maintained in their upper, closed positions by counterweights 290 and 291, respectively, that are secured to the upper ends of upwardly and rearwardly projecting legs of L-shaped brackets 292 and 293, respectively. The horizontal legs of the brackets 292 and 293 are secured to the floor sections 284 and 285, respectively. If and when jamming should occur in either chute 272 or 273, cans whose progress through that chute is interrupted will accumulate until the weight of several cans is imposed upon the movable floor section of that chute, whereupon the floor section will swing downward and thus permit the cans that have come to rest thereon to drop out of the chute. The brackets 292 and 293 are of such configuration that when a floor section 284 or 285 swings downward to its can releasing position, its associated counterweight passes through the vertical plane of the associated pivot rod with the result that the counterweight then holds the floor section in open position until manually returned to its original position. This affords opportunity for the jam that has caused interruption in flow of cans through the chute to be corrected before the floor section 284 or 285, as the case might be, is returned to its position of alignment with the remainder of the floor of its associated chute. Therefore, even though the cooker G and the discharge valve H continue to operate after such a jam occurs in either chute 272 or 273, the pile up of cans resulting from such a jam is not permitted to reach the discharge valve H and to cause any damage to the discharge valve H or to other parts of the cooker G.

The cooker apparatus disclosed may be readily adapted for the processing of a single procession of tall cans, instead of a double file of short cans, by removing the divider plate 172 from the cup feed D and the partition 77 from the feed table A, and replacing the can turner B and chute C, and the discharge conveyor 267. As a result, the expensive feed table, cup feed, elevator and cooker may be utlized alternatively for either of two sizes of cans, with great economic savings resulting.

While a particular embodiment of the present invention has been shown and described it will be understood that the apparatus is capable of modification and variation without departing from the principles of the invention and that the scope of the invention should be limited only by the scope and proper interpretation of the claims appended hereto.

The invention having thus been described, what is believed to be new and desired to be protected by Letters Patent is:

What is claimed is:

1. An article conveyor comprising a moving surface, two opposed reciprocatable walls mounted at opposite sides of said surface, a pair of opposed cam wheels rotatably mounted respectively adjacent said opposed reciprocatable side walls, one of the opposed cam wheels being provided on its inner surface with a projection, the other cam wheel being provided on its inner surface with a depression in alignment with said projection, cam follower means for each said cam wheel, one end of each of said cam follower means being in abutment with the inner surface of the respective cam wheel and the other end thereof being operatively connected with the respective side wall whereby said side walls may be reciprocated by rotation of said cam wheels to prevent jamming of articles on said moving surface, and means for rotating said cam wheels.

2. A conveyor comprising a series of spaced moving rods adapted to convey a double row of articles in aligned relation over a stationary surface, a pair of opposed fingers pivotally mounted at opposite sides of said surface and adapted to project thereover, said fingers being spring-urged toward one another whereby the fingers will center any article in either of said rows opposite an unoccupied position in the other row, said surface being provided with a centrally located hole adjacent said pair of fingers for passage of a centered article therethrough.

3. A conveyor comprising a series of spaced moving rods adapted to convey two rows of articles in transverse alignment over a stationary surface, a pair of opposed fingers pivotally mounted at opposite sides of said surface and adapted to project thereover, said fingers being spring-urged toward one another whereby the fingers of said pair will center any article in either of said rows opposite an unoccupied position in the other row, said surface being provided with a centrally located hole adjacent said fingers for passage of a centered article therethrough, and a presser plate adapted to resiliently bear upon containers being conveyed along said surface for subsequent ejection through said hole.

4. A conveyor system, comprising means for advancing a plurality of rows of articles in side-by-side relation to and through an article processing unit, a first control means mounted adjacent said advancing means and adapted to interrupt the flow of articles in said plurality of rows when a deficiency occurs in any of said rows, and a second control means mounted downstream from said first control means and adapted to discharge an article opposite an unoccupied position in any of said rows.

5. A conveyor system, comprising means for advancing a plurality of rows of articles in side-by-side relation, a feed table having a moving surface for introducing articles to said article advancing means, a first control means operatively associated with said advancing means and adapted to interrupt the flow of articles in said plurality of rows when a deficiency of articles occurs in any of said rows, and a second control means mounted downstream from said first control means and adapted to discharge from said article advancing means any article opposite an unoccupied position in any of said rows.

6. An apparatus for processing a product within containers comprising a conveyor adapted to advance two rows of transversely aligned containers along a predetermined path, a floor arranged to support the containers as the containers are advanced by said conveyor, said floor having an opening centered transversely relatively to the rows of containers and being of a size sufficient for only single containers centered transversely of said rows to pass therethrough, and container centering means for contacting the containers of each row as they move by said opening to urge them laterally inward of the conveyor, inward lateral movement of each container in either row normally being resisted by a container in the other row, whereby any containers in either of said rows opposite an unoccupied position in the other of said rows will be centered and will pass through said opening.

7. An apparatus for handling containers comprising transporting means having a plurality of compartments of a size adapting each compartment to accommodate two aligned containers, a discharge conveyor connected to said transporting means and adapted to receive containers emerging from said transporting means, a vertical partition laterally dividing a part of said discharge conveyor into two chutes, an inclined floor in each of said chutes establishing communication with said transporting means, one of said floors being more steeply inclined than the other, and a curved guide finger secured to and projecting from said vertical partition toward said transporting means, said finger being curved over and spaced above said more steeply inclined floor whereby the containers supported by the other floor contact said finger and are guided into their associated chute.

References Cited in the file of this patent

UNITED STATES PATENTS

| | | |
|---|---|---|
| 1,368,583 | Thompson | Feb. 15, 1921 |
| 1,711,820 | Wilcke | May 7, 1929 |
| 1,916,255 | Gabot | July 4, 1933 |
| 1,970,574 | Pelosi | Aug. 21, 1934 |
| 1,990,549 | Kimball | Feb. 12, 1935 |
| 2,158,069 | Grover | May 16, 1939 |
| 2,439,657 | Hexter | Apr. 13, 1948 |
| 2,511,266 | Hube | June 13, 1950 |
| 2,555,602 | Nutt | June 5, 1951 |
| 2,642,980 | Soucek | June 23, 1953 |
| 2,710,089 | Kerr | June 7, 1955 |
| 2,743,001 | Nordquist | Apr. 24, 1956 |
| 2,775,334 | Jeremiah | Dec. 25, 1956 |
| 2,802,560 | Engleson | Aug. 13, 1957 |